(12) United States Patent
Park

(10) Patent No.: US 7,952,280 B2
(45) Date of Patent: May 31, 2011

(54) FLUORESCENT LAMP AND LIQUID CRYSTAL DISPLAY DEVICE HAVING THE SAME

(75) Inventor: Ki-Duck Park, Dayul-Ri (KR)

(73) Assignee: LG Display Co., Ltd., Seoul (KR)

( * ) Notice: Subject to any disclaimer, the term of this patent is extended or adjusted under 35 U.S.C. 154(b) by 255 days.

(21) Appl. No.: 12/254,275

(22) Filed: Oct. 20, 2008

(65) Prior Publication Data
US 2009/0134770 A1   May 28, 2009

(30) Foreign Application Priority Data

Nov. 23, 2007   (KR) .................. 10-2007-0120516

(51) Int. Cl.
*H01J 65/00* (2006.01)
*H01J 61/06* (2006.01)
(52) U.S. Cl. .................. 313/607; 313/491; 313/234
(58) Field of Classification Search .................. 313/234, 313/607, 491
See application file for complete search history.

(56) References Cited

U.S. PATENT DOCUMENTS

| 2006/0145618 A1* | 7/2006 | Moon | 313/607 |
| 2006/0145619 A1* | 7/2006 | Bang | 313/607 |
| 2006/0273707 A1* | 12/2006 | Lim | 313/234 |

* cited by examiner

*Primary Examiner* — Joseph L Williams
(74) *Attorney, Agent, or Firm* — Brinks Hofer Gilson & Lione

(57) ABSTRACT

Disclosed is an EEFL and LCD device using the same, the EEFL comprising: a glass tube coated with a fluorescent material therein and filled with discharge gas, main electrodes at both ends of the glass tube and sub-electrodes formed at an outer surface of the glass tube and being respectively spaced from the main electrodes, or comprising: a glass tube coated with a fluorescent material therein and filled with discharge gas, main electrodes at both ends of the glass tube, sub-electrodes at an outer surface of the glass tube and being respectively spaced from the main electrodes and electrode connection lines connecting each of the main electrodes and the sub-electrodes to each other.

19 Claims, 5 Drawing Sheets

NORMAL TEMPERATURE (25 °C): Vth,VL

LOW TEMPERATURE (0 °C): Vth,VL

US 7,952,280 B2

FLUORESCENT LAMP AND LIQUID CRYSTAL DISPLAY DEVICE HAVING THE SAME

RELATED APPLICATIONS

The present disclosure relates to subject matter contained in priority Korean Application No. 2007-0120516, filed on Nov. 23, 2007, which is herein expressly incorporated by reference in its entirety.

BACKGROUND

1. Field of the Invention

The present invention relates to a fluorescent lamp for a backlight, and particularly, to an External Electrode Fluorescent Lamp (EEFL) having an improved discharge starting (or inception) characteristic of a low temperature lamp by controlling a phenomenon that a conventional EEFL is partially darkened at an initial low temperature, resulting from changing a structure of electrodes, and a LCD device having the same.

2. Background of the Invention

Displays becomes more and more important as a medium for transferring visual information in the current information society. In order to become dominant, displays should have low power consumption, have a thin thickness, be light weight and have a high picture quality.

The display may be classified into a radiative type emitting light by itself, such as a Cathode Bay Tube (CRT), an Electro Luminescence (EL), a Light Emitting Diode (LED), a Vacuum Fluorescent Display (VFD), a Field Emission Display (FED), a Plasma Display Panel (PDP), and a non-radiative type that cannot emit light by itself such as a Liquid Crystal Display (LCD) device.

The LCD device serves to display images by using an optical anisotropy of a liquid crystal. Since the LCD device has advantages that visibility is excellent compared with the conventional CRT, and the average power consumption and heating value are lower than those of the CRT when both of them have the same screen size, currently, the LCD has become the focus of the next-generation display device together with the PDP or the FED.

Since the liquid crystal used for the LCD device is not a light emitting material that emits light by itself, but a light receiving material displaying on the screen by modulating the amount of light incident from outside, the LCD device needs an additional light source for irradiating light onto a light crystal display panel, that is, a lamp unit.

Generally, the LCD device serves to display desired images by supplying data signals according to image information to pixels arranged in a matrix shape and adjusting a light transparency of the pixels.

To this end, the LCD device includes a liquid crystal display panel in which a liquid crystal is infused between an array substrate and a color filter so as to output images, a backlight unit that emits light on a front surface of the panel and which is installed on a rear surface of the liquid crystal display panel, and a plurality of case components fixing the liquid crystal display panel and the backlight unit to each other and coupled to them.

A common electrode and a pixel electrode are formed on the liquid crystal display panel in which the array substrate and the color filter substrate are combined with each other and apply an electric field to a liquid crystal layer. If a voltage from the data signal applied to the pixel electrode is controlled under a state that a voltage is applied to the common electrode, the liquid crystal of the liquid crystal layer may be rotated by dielectric anisotropy according to the electric field between the common electrode and the pixel electrode. Accordingly, light is transmitted or blocked for every pixel thus to display a character or image.

The backlight unit serves to implement a planar light having a uniform brightness from a fluorescent lamp used as a light source. The thickness and the power consumption of the LCD device depend on the backlight unit that is as thin as possible and the utilization efficiency of light.

The backlight unit is classified into a direct type where the fluorescent lamp is disposed on the rear surface of the liquid crystal display panel so as to directly transmit light to the front surface of the panel, and an edge type where the fluorescent lamp is disposed at one lateral surface or both lateral surfaces of the liquid crystal display panel so that light can be reflected, diffused and collected though a light guide plate, a reflection sheet and other sheets and be transmitted to the front surface of the panel.

The edge type backlight unit is easily fabricated. On the other hand, the direct type backlight unit is relatively suitable for a large-sized LCD device when considering the uniformity of light.

Currently, the fluorescent lamp used as the light source of the backlight unit is mainly implemented as a Cold Cathode Fluorescent Lamp (CCFL).

The CCFL is easily applied to the edge type backlight unit, but not suitable for the direct type backlight unit.

The reason is as follows. The CCFL is implemented in a manner such that a lamp electrode and a lamp line are soldered to each other and then a connected portion therebetween is wrapped by a silicon rubber. And, when using the direct type backlight unit that is provided with several lamps, a lot of processing time is needed to solder each lamp and protect each lamp with the silicon rubber. Also, as an integral type lamp holder is applied thereto, it is very difficult to protect the respective connected portions.

In the CCFL, an increasing voltage is applied to electrodes at both ends of the fluorescent lamp until a starting (or inception) voltage is achieved in which a current can be conducted. Then the electrodes are stabilized when the voltage is above the starting voltage. In order to continuously emit light, an AC voltage must be applied to the electrodes and maintained.

The aforementioned is limited to one fluorescent lamp. In the direct type backlight unit, the fluorescent lamps should be respectively operated.

Thus, the backlight unit in which a CCFL is used has been mostly fabricated as the edge type. Accordingly, the lamp has been developed to be easily applicable to the direct type backlight unit. And, an External Electrode Fluorescent Lamp (EEFL) has been proposed.

The conventional EEFL will be explained with reference to FIGS. 1 and 2.

FIG. 1 is a schematic view showing a structure of an EEFL in accordance with the related art.

FIG. 2a is a graph showing changes of a lamp current according to a lamp threshold voltage (Vth) at a normal temperature (25° C.) in the EEFL in accordance with the related art, and FIG. 2b is a graph showing changes of a lamp current according to a lamp threshold voltage (Vth) at a low temperature (0° C.) in the EEFL in accordance with the related art.

An EEFL (10) in accordance with the related art, as shown in FIG. 1. Unlike the structure of the CCFL, in which electrodes are protruded inwardly at both sides of a glass tube 11, external electrodes 13 formed of a metallic material are formed at the outside of both ends of the fluorescent lamp 10.

And, ions polarized by the external electrodes 13 are concentrated at both ends of the fluorescent lamp 10, and then the ions are synthesized at the time of zero-crossing by a current of a high voltage. Through this process, the fluorescent lamp 10 emits light.

Here, the external electrodes 13 are not disposed in the fluorescent lamp 10, which indicates that capacitors are disposed at both ends of the fluorescent lamp 10 in an equivalent circuit. Accordingly a plurality of fluorescent lamps 10 can be driven in parallel with each other.

Thus, if there is an inverter having a large capacity, the fluorescent lamp 10 can emit light with the simpler structure and the inverter, compared with the CCFL.

Generally, electrical characteristics of a lamp depend on a filled gas pressure, a material of a glass tube, a diameter of the lamp, a lamp length. Here, an electrode, namely, a length of an external electrode, is the most decisive factor for the electrical characteristics of the EEFL.

If the length (L) of the external electrodes 13 becomes shorter, the lamp discharge voltage (hereafter, referred to as "VL") increases because of a reduction of a capacitance value of the external electrodes 13. However, a discharge path becomes longer. Accordingly the lamp threshold voltage (hereafter, referred to as "Vth") increases.

In contrast, if the length (L) of the external electrodes 13 becomes longer, the discharge path becomes shorter and thus the Vth drops. However, the VL drops because of an increase in the capacitance value of the external electrodes 13.

In the case of the direct type LCD device, in order to prevent an initial partial darkness, the VL should be higher than the Vth.

That is, the VL means a lamp stabilization voltage based on a constant tube current, i.e., a lamp voltage when three minutes elapses after the lamp is lightened. The Vth means a minimum lamp voltage necessary to stabilize the lamp after insulation damage on the lamp occurs because the voltage is applied in a gradually increased manner.

However, the EEFL in the related art, as shown in FIGS. 2a and 2b, is changed to have the VL lower than the Vth when a lighting environment is changed to a lower temperature from the normal temperature.

Thus, the fluorescent lamp is not perfectly lightened at the low temperature, which causes a screen quality of the LCD device to be deteriorated.

BRIEF SUMMARY

Therefore, an object of the present invention is to provide an EEFL having an improved discharge starting (or inception) characteristic of a low temperature lamp by controlling a phenomenon that a conventional EEFL is partially darkened at an initial low temperature, resulting from changing a structure of electrodes, and a LCD device having the same.

An EEFL comprises a glass tube coated with a fluorescent material therein and filled with discharge gas, main electrodes formed at both ends of the glass tube and sub-electrodes formed at an outer surface of the glass tube and being respectively spaced from the main electrodes.

In another aspect of the present invention, there is provided an EEFL comprising, a glass tube coated with a fluorescent material therein and filled with discharge gas, main electrodes formed at both ends of the glass tube, sub-electrodes formed at an outer surface of the glass tube and being respectively spaced from the main electrodes and electrode connection lines connecting each of the main electrodes and the sub-electrodes to each other.

In still another aspect of the present invention, there is provided a LCD device using the EEFL, the LCD device comprising, a liquid crystal display panel, and fluorescent lamps respectively comprising main electrodes formed at both ends of glass tubes and sub-electrodes formed at an outer surface of the glass tube and being respectively spaced from the main electrodes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Description will now be given in detail of the present invention, with reference to the accompanying drawings.

Figure 1:
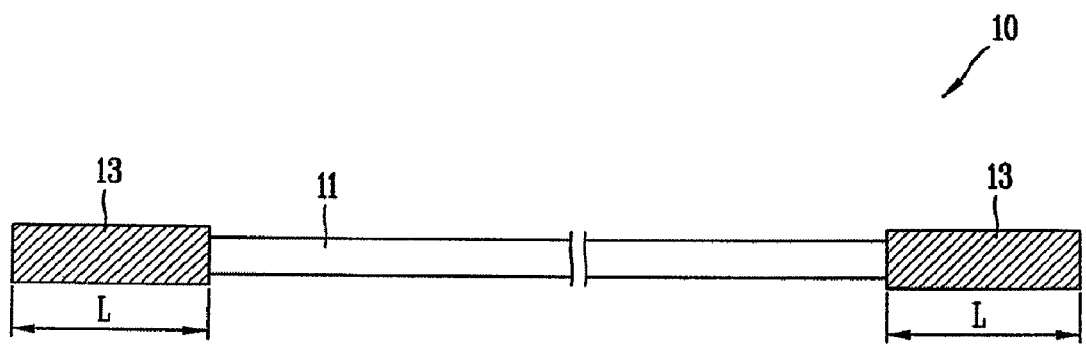
FIG. 1 is a view schematically showing a structure of an EEFL in accordance with the related art.
Figure 2A:
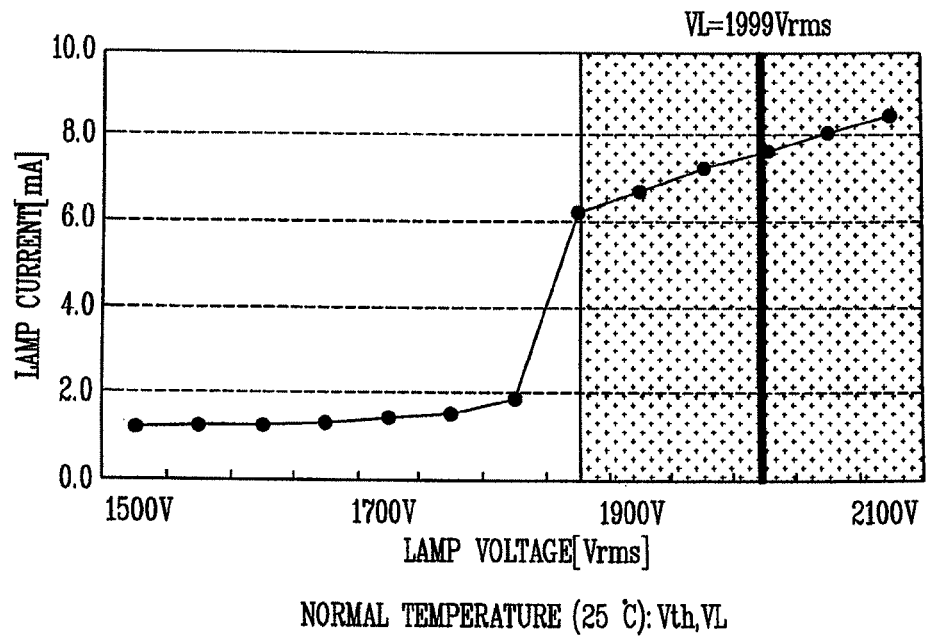
FIG. 2a is a graph showing changes of a lamp current according to a lamp threshold voltage (Vth) at a normal temperature (25° C.) in the EEFL in accordance with the related art.
Figure 2B:
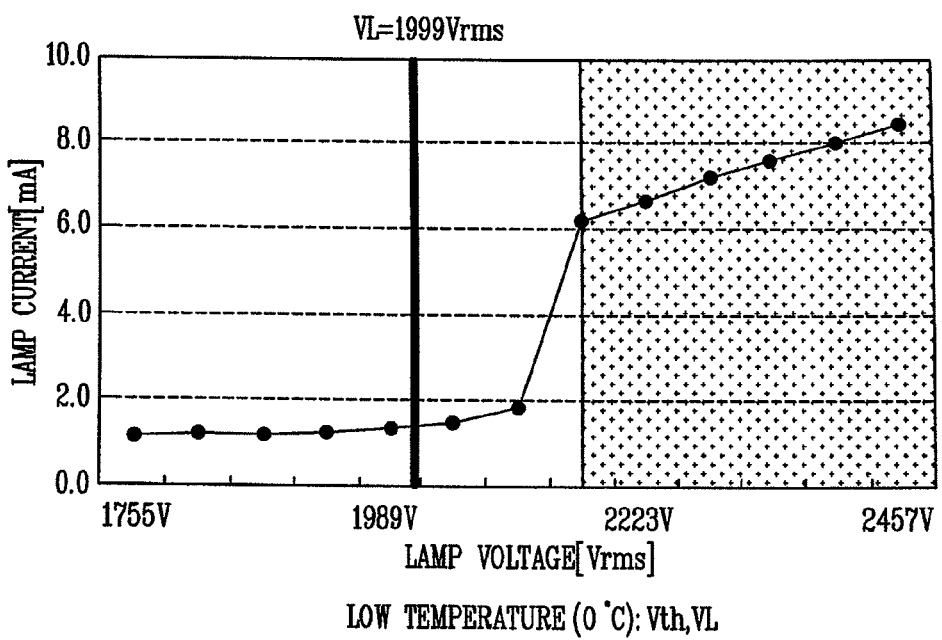
FIG. 2b is a graph showing changes of a lamp current according to a lamp threshold voltage (Vth) at a low temperature (0° C.) in accordance with the related art.
Figure 3:
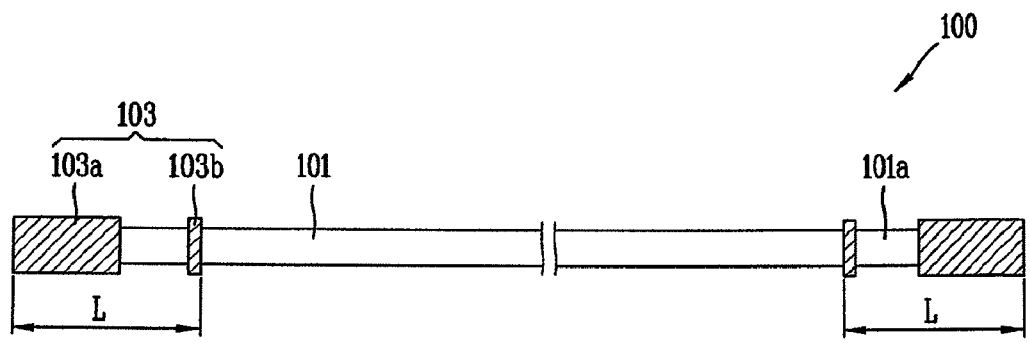
FIG. 3 is a section view schematically showing an EEFL in accordance with one embodiment of the present invention.

FIG. 3 is a section view schematically showing an EEFL in accordance with one embodiment of the present invention.

Figure 4:
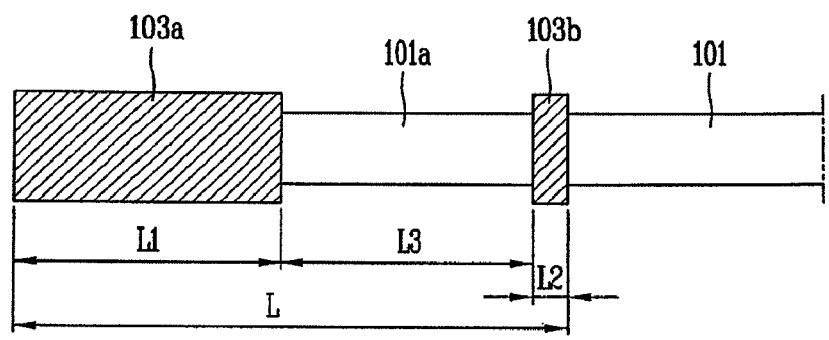
FIG. 4 is an enlarged view schematically showing one side of the EEFL in accordance with the one embodiment of the present invention.

FIG. 4 is an enlarged view schematically showing one side of the EEFL in accordance with the one embodiment of the present invention.

Figure 5:
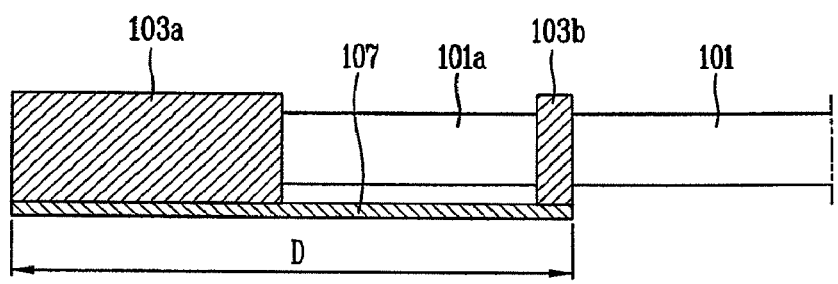
FIG. 5 is an enlarged section view schematically showing one side of the EEFL in accordance with the one embodiment of the present invention, showing a common electrode contacting a main electrode and a sub-electrode of the EEFL.

FIG. 5 is an enlarged section view schematically showing one side of the EEFL in accordance with the one embodiment of the present invention, showing a common electrode contacting a main electrode and a sub-electrode of the EEFL.

As shown in FIG. 3, an External Electrode Fluorescent Lamp (EEFL) 100 includes a discharge glass tube 101 coated with a fluorescent material therein and filled with discharge gas, and external electrodes 103 including main electrodes 103a encompassing both ends of the glass tube 101 and sub-electrodes 103b respectively spaced from the main electrodes 103a by a specific distance and formed at an outer surface of the glass tube 101.

Here, as shown in FIG. 4, a length (L) of each external electrode 103 includes a length (L1) of the main electrode 103a, a length (L2) of the sub-electrode 103b and a length (L3) of a radiating portion 101a between the electrodes.

The length (L1) of the main electrode 103a occupies at least half of the total length (L) of the external electrode 103, and the length (L2) of the sub-electrode 103b occupies less than 1/10 of the total length (L) of the external electrode 103, preferably.

The main electrode 103a may be formed of an alloy of nickel (Ni) and ferrum (Fe). The sub-electrode 103b may be formed of a metallic tape of cuprum (Cu) or a metallic material such as Ni, Fe, niobium (Nb).

The LCD device is a non-radiative display device and requires a backlight unit. As the LCD device becomes larger, the backlight unit is required to be larger and a fluorescent lamp disposed therein is required to be longer.

As such, if the fluorescent lamp 100 becomes longer, the external electrode 103 discharging the fluorescent lamp 100 also should be longer. However, the non-radiative portion is formed as long as the length (L) of the external electrode 103, thereby reducing brightness.

However, by dividing each external electrode 103 into the main electrode 103a and the sub-electrode 103b and forming the radiating portion 101a therebetween, an area of the external electrode 103 may be minimized, that is, the length (L) of the external electrode 103. That is, as a portion for forming the external electrode 103 is substituted for a radiative area and then light is emitted through the radiative area, a non-radiative area may be reduced.

As shown in FIG. 5, a common electrode 107 is disposed below the EEFL 100. The common electrode 107 is electrically connected to the external electrode, namely, the main electrode 103a and the sub-electrode 103b.

Here, a length (D) of the common electrode 107 is shorter than the length (L) of the external electrode 103, that is, a sum of the length (L1) of the main electrode 103a, the length (L2) of the sub-electrode 103b and the length (L3) of the radiating portion 101a between the electrodes.

If the length (D) of the common electrode 107 is longer than the length (L) of the external electrode 103, an exceeding portion of the common electrode 107 may be located at the radiative area of the glass tube 101, which causes the luminous efficiency of light to be deteriorated.

In a state where the sub-electrode 103b of the external electrode 103 is separated from the main electrode 103a, upon applying a voltage to the common electrode 107, the Vth is dropped and the VL is increased. Accordingly the partial darkness phenomenon (P factor) at an initial low temperature is improved. That is, by maintaining a discharge path same as that of the conventional EEFL, the initial lighting voltage can be maintained at a constant level. Also, by reducing the capacitance value caused by reduction of the electrode area, the VL may be increased.

Particularly, in order to improve the P factor at the low temperature, the lower the value of the P factor (Vth/VL×100%), the more advantageous the effects.

As a result of comparing electrical characteristics of the EEFL in accordance with the present invention with those of the conventional EEFL, when the Vth is maintained to have a constant level and the P factor is reduced resulting from increasing the VL, there is an improvement in the partial darkness phenomenon at the initial low temperature that result from the conventional EEFL not being lightened or only being partially lightened at the initial low temperature.

For example, when the length of the external electrode of the conventional EEFL is 40 mm, it is assumed that the Vth is 1624 Vrms, and the VL is 1572 Vrms.

Here, the P factor can be expressed as the following equation, Vth/VL×100%=103.4%.

On the other hand, when the length of the main electrode 103a is 20 mm and the length of the sub-electrode 103b is 3 mm in the EEFL in accordance with the present invention, it is assumed that the Vth is 1675 Vrms, and the VL is 1904 Vrms.

Here, the P factor can be expressed as the following equation, Vth/VL×100%=88.0%.

As aforementioned, according to the present invention, the partial darkness phenomenon at the initial low temperature can be improved.

An EEFL in accordance with another embodiment of the present invention and an LCD device using the EFFL will be explained in detail with reference to accompanying drawings.

Figure 6:
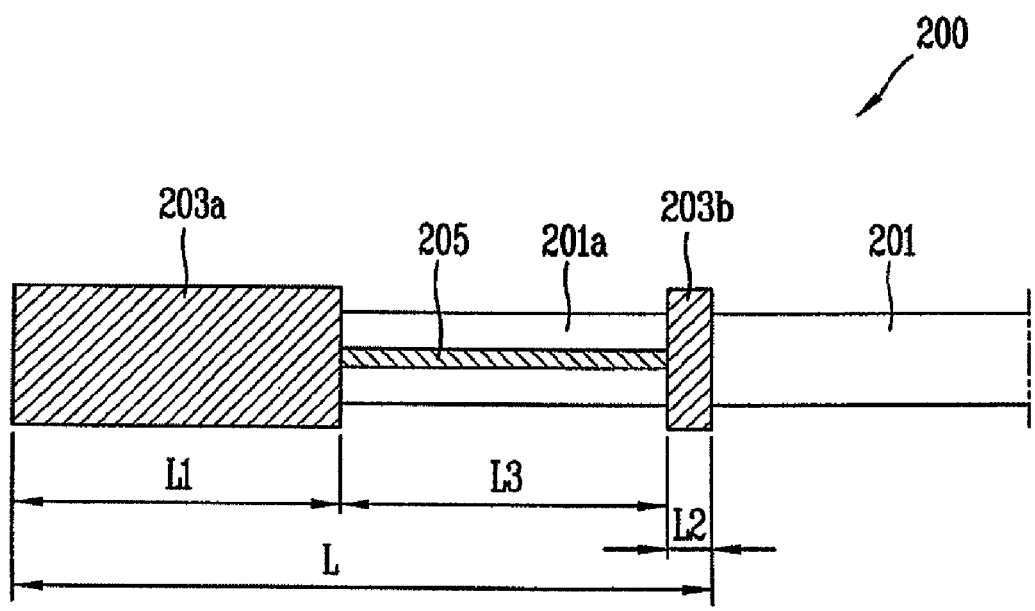
FIG. 6 is a section view schematically showing an EEFL in accordance with another embodiment of the present invention.

FIG. 6 is a section view schematically showing an EEFL in accordance with another embodiment of the present invention.

Figure 7:
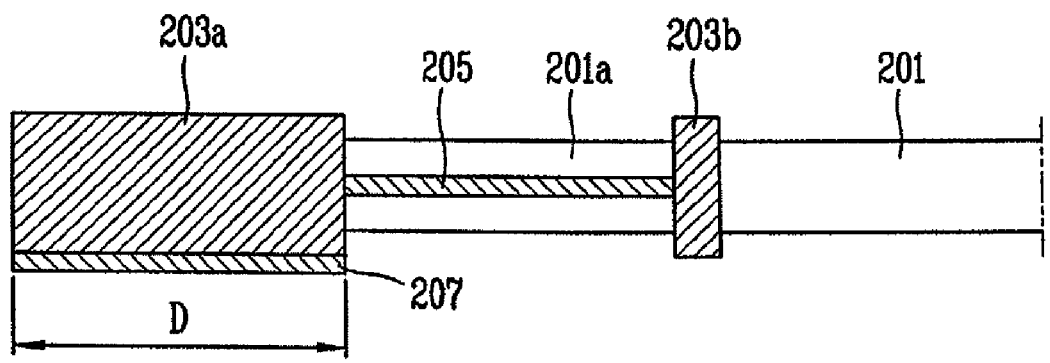
FIG. 7 is an enlarged view schematically showing one side of the EEFL in accordance with the another embodiment of the present invention.

FIG. 7 is an enlarged view schematically showing one side of the EEFL in accordance with the another embodiment of the present invention.

An EEFL 200 in accordance with the another embodiment of the present invention, as shown in FIG. 6, includes a discharge glass tube 201 coated with a fluorescent material therein and filled with discharge gas, and external electrodes including main electrodes 203a encompassing both ends of the glass tube 201, sub-electrodes 203b respectively spaced from the main electrode 203a by a specific distance and formed at an outer surface of the glass tube 201 and electrode connection lines 205 electrically connecting each of the main electrodes 203a and the sub-electrodes 203b to each other.

Here, as shown in FIG. 6, a length (L) of each external electrode includes a length (L1) of the main electrode 203a, a length (L2) of the sub-electrode 203b and a length (L3) of a radiating portion 201a between the electrodes.

The length (L1) of the main electrode 203a occupies at least half of the total length (L) of the external electrode 203, and the length (L2) of the sub-electrode 203b occupies less than 1/10 of the total length (L) of the external electrode 203, preferably.

And, the main electrode 203a may be formed of an alloy of Ni and Fe. The sub-electrode 203b may be formed of a metallic tape of Cu or a metallic material such as Ni, Fe, Nb.

The LCD device is a non-radiative display and requires a backlight unit. As the LCD device becomes larger, the backlight unit is required to be larger and a fluorescent lamp disposed therein is required to be longer.

As such, if the fluorescent lamp 200 becomes longer, the external electrode discharging the fluorescent lamp 200 also should be longer. However, the non-radiative portion is formed as long as the length (L) of the external electrode, thereby reducing brightness.

However, by dividing each external electrode into the main electrode 203a and the sub-electrode 203b and forming the radiating portion 201a between the electrodes 203a and 203b, an area of the external electrode may be minimized, that is, the length (L) of the external electrode. That is, as a portion for forming the external electrode is substituted for a radiative area and then light is emitted through the radiative area, the non-radiative area may be reduced.

As shown in FIG. 7, a common electrode 207 is disposed below the main electrode 203a of the external electrode. The common electrode 207 is electrically connected to the main electrode 203a. Here, since the main electrode 203a is connected to the sub-electrode 203b by the electrode connection line 205, the common electrode 207 is also electrically connected to the sub-electrode 203b.

Here, a length (D) of the common electrode 207 is the same as or shorter than the length (L) of the external electrode, that is, the length (L1) of the main electrode 203a.

If the length (D) of the common electrode 207 is longer than the length (L) of the external electrode, an exceeding portion of the common electrode 207 may be located at the radiative area of the glass tube 201a, which causes the luminous efficiency of light to be deteriorated.

In a state where the sub-electrode 203b of the external electrode is separated from the main electrode 203a, upon applying a voltage to the common electrode 207, the Vth is dropped and the VL is increased. Accordingly the partial darkness phenomenon (P factor) at an initial low temperature may be improved.

Particularly, in order to improve the P factor at the initial low temperature, the lower a value of the P factor (Vth/VL× 100%), the more advantageous the effects of the present invention are.

The results in the comparison between the electrical characteristics of the EEFL in accordance with this other embodiment with the conventional EEFL are the same as the results of the comparison between the first embodiment describe above with the conventional EEFL.

Thus, according to the present invention, as the Vth is maintained to have a constant level and the P factor is reduced resulting from increasing the VL, the partial darkness phenomenon is improved at the initial low temperature resulting from that the conventional EEFL is not lightened or partially lightened at the initial low temperature. That is, by maintaining a discharge path same as that of the conventional EEFL, the Vth can be maintained to have a constant level. Also, by reducing the capacitance value caused by reduction of the electrode area, the VL may be increased.

A LCD device using the EEFL in accordance with the present invention will be explained with reference to FIG. 8.

Figure 8:
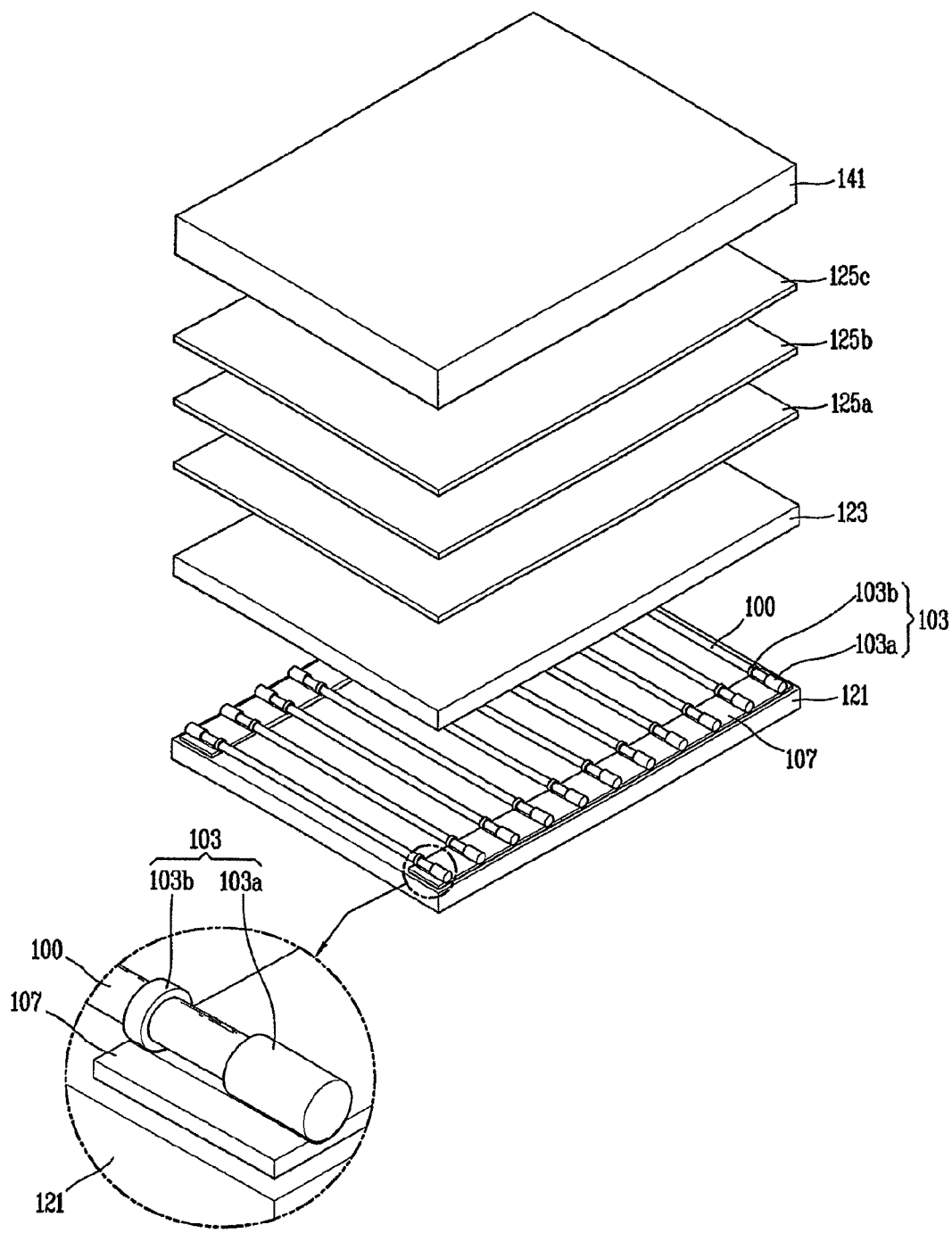
FIG. 8 is an exploded perspective view showing a LCD device using an EEFL in accordance with the present invention.

FIG. 8 is an exploded perspective view showing a LCD device using the EEFL in accordance with the one embodiment of the present invention.

The LCD device using the EEFL in accordance with the one embodiment of the present invention, as shown in FIG. 8, includes the plurality of fluorescent lamps 100 coated with a fluorescent material therein so as to emit light, an outer case 121 for fixing and supporting the fluorescent lamps 100, and a diffusion plate 123 and light diffusion units 125a, 125b, 125c interposed between the fluorescent lamps 100 and a liquid crystal display panel 141.

Here, the light diffusion units 125a, 125b, 125c serve to prevent a shape of the fluorescent lamps 100 from being displayed on a display surface of the liquid crystal display panel 141 and to provide a light source having a brightness uniformly distributed.

A lamp reflection plate (not shown) is disposed at an inner surface of the outer case 121 so as for light generated from the fluorescent lamps 100 to be concentratively irradiated to the display unit of the liquid crystal display panel 141, accordingly it is capable of enhancing the utilization efficiency of the light.

Each external electrode 103 of the fluorescent lamps 100 is composed of the main electrode 103a and the sub-electrode 103b. The sub-electrode 103b is spaced from the main electrode 103a by the constant distance.

The common electrode 107 is disposed below the main electrode 103a and the sub-electrode 103b and electrically connected thereto.

In the LCD device using the EEFL, a voltage is applied through the common electrode 107 connected to the external electrodes 103 formed at both ends of each of the fluorescent lamps 100 and then an electric field is formed in the fluorescent lamp 100 through the main electrode 103a and the sub-electrode 103b respectively forming each of the external electrodes 103, accordingly each of the fluorescent light 100 emits light.

The light emitted through the fluorescent lamps 100 is made to be incident into the liquid crystal display panel 141 through the diffusion plate 123 and the light diffusion units 125a, 125b, 125c.

The EEFL in accordance with the present invention and the LCD device using the same have the following effects.

According to the LCD device using the EEFL in accordance with the present invention, as the Vth is maintained to have the constant level and the P factor is reduced resulting from increasing the VL, the partial darkness phenomenon is improved at the initial low temperature resulting from the conventional EEFL not lightened or partially lightened at the initial low temperature, it is capable of enhancing a screen quality of the LCD device.

According to the EEFL in accordance with the present invention and the LCD device using the same, the main electrodes are formed in external electrodes at both ends of the lamp and sub-electrodes are spaced from each one end of the main electrodes by the constant distance. A voltage is applied to the main electrodes and the sub-electrodes through the common electrode, accordingly the Vth is dropped and the VL is increased, thereby the partial darkness phenomenon at the initial low temperature may be improved.

Compared with the conventional EEFL, the EEFL of the present invention, the P factor is reduced by maintaining the Vth to have the constant level and increasing the VL, accordingly the partial darkness phenomenon at the initial low temperature resulting from that the conventional EEFL not lightened or partially lightened at the initial low temperature can be improved.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An External Electrode Fluorescent Lamp (EEFL) comprising:
   a glass tube coated with a fluorescent material therein and filled with discharge gas;
   main electrodes at both ends of the glass tube;
   sub-electrodes at an outer surface of the glass tube and being respectively spaced from the main electrodes; and an electrode connection line connecting the main electrode and the sub-electrode to each other, wherein the main electrodes and the sub-electrodes constitute external electrodes of the fluorescent lamp, and wherein a length of each sub-electrode is smaller than that of each main electrode.

2. The EEFL of claim 1, wherein radiating portions are between the main electrodes and the sub-electrodes.

3. The EEFL of claim 1, wherein a length of each main electrode occupies more than half of a length of each external electrode.

4. The EEFL of claim 1, wherein a length of each sub-electrode occupies less than 1/10 of a length of each external electrode.

5. The EEFL of claim 1, wherein the sub-electrodes comprise a metallic tape or a material selected from the group consisting of Ni, Fe, and Nb.

6. The EEFL of claim 1, wherein the sub-electrodes comprise a metallic material.

7. The EEFL of claim 6, wherein the sub-electrodes comprise a material selected from the group consisting of Ni, Fe, and Nb.

8. The EEFL of claim 1, wherein the main electrodes are comprise a metallic material.

9. The EEFL of claim 8, wherein the material comprises an alloy of Ni and Fe.

10. An EEFL comprising:
a glass tube coated with a fluorescent material therein and filled with discharge gas;
main electrodes at both ends of the glass tube;
sub-electrodes at an outer surface of the glass tube and being respectively spaced from the main electrodes; and
electrode connection lines connecting each of the main electrodes and the sub-electrodes to each other, wherein the main electrodes, the sub-electrodes and the electrode connection lines constitute external electrodes of the fluorescent lamp, and wherein a length of each sub-electrode is smaller than that of each main electrode.

11. The EEFL of claim 10, wherein radiating portions are between the main electrodes and the sub-electrodes.

12. The EEFL of claim 10, wherein a length of each main electrode is more than half of a length of each external electrode.

13. The EEFL of claim 10, wherein a length of each sub-electrode is less than 1/10 of a length of each external electrode.

14. The EEFL of claim 10, wherein the sub-electrodes are formed of a metallic tape.

15. The EEFL of claim 10, wherein the main electrodes are comprise a metallic material.

16. The EEFL of claim 15, wherein the metallic material comprises an alloy of Ni and Fe.

17. The EEFL of claim 10, wherein the main electrodes are formed of a metallic material.

18. The EEFL of claim 17, wherein the material comprises an alloy of Ni and Fe.

19. A LCD device using the EEFL, the LCD device comprising:
a liquid crystal display panel; and
fluorescent lamps respectively comprising main electrodes at both ends of glass tubes and sub-electrodes at an outer surface of the glass tube and being respectively spaced from the main electrodes, and electrode connection lines connecting each of the main electrodes and the sub-electrodes to each other, wherein the main electrodes and the sub-electrodes constitute external electrodes of the fluorescent lamp, and wherein a length of each sub-electrode is smaller than that of each main electrode.

* * * * *